United States Patent Office.

JAMES P. THURMON AND LEMUEL THURMON, OF WARRENTON, MISSOURI.

Letters Patent No. 65,302, dated May 28, 1867.

IMPROVED MEDICAL COMPOUND.

The Schedule referred to in these Letters Patent and making part of the same.

TO ALL WHOM IT MAY CONCERN:

Be it known that we, LEMUEL THURMON and JAMES P. THURMON, of Warrenton, in the county of Warren, and State of Missouri. have invented a new and improved "Medical Composition;" and we do hereby declare that the following is a full, clear, and exact description thereof, which will enable others skilled in the art to fully understand and make use of the same.

The present invention relates to a medical composition embraced in and secured by Letters Patent granted to John Thurmon on the fourth day of April, A. D. 1865, and this invention consists in adding to the several ingredients therein named, in the proportion of one gallon of such mixture or composition, ten (10) pounds corn meal; one (1) pound rye meal; five (5) ounces malt or dried corn; one-half ($\frac{1}{2}$) pound sarsaparilla root; two (2) ounces cedar top; one-half ($\frac{1}{2}$) pound running-brier root; one (1) pound poke root; two (2) ounces wild cherry-tree bark; one (1) ounce burr-vine root.

The malt or dried corn is ground to a powder or meal, and, together with the corn and rye meal, scalded in hot water, when, allowing it to stand for three hours, it is then slaked with warm water, when, cooling it with cold water, allow it to stand for several days, four, for instance, and it is then ready to be and is distilled in a copper or other suitable still, to which heat is applied in any proper manner. The steam or vapor arising in the still passes off therefrom through a condensing-worm or other suitable condensing apparatus, wherein being condensed into a liquid, such liquid is then boiled or redistilled, adding thereto the sarsaparilla root, poke root, wild cherry-tree bark, cedar top, running-brier root, and burr-vine root, and its vapors condensed as before, when the liquid thus produced is ready and fit for use as a medicine.

The medical composition produced as above described will not sour in warm nor freeze in cold weather, and for use in cases of scrofula, syphilis, gonorrhœa, erysipelas, kidney diseases, mercurial complaints, salt rheum, sores, ulcers, rheumatism, indigestion, and weak stomach, is most excellent, effective, and advantageous.

Having thus described our invention, we claim as new, and desire to secure by Letters Patent—

The improved medical composition, produced substantially with the ingredients mixed together in or about the proportions stated, in combination and in mixture with the medical compound herein referred to.

The above specification of our invention signed by us this 26th day of , 1867.

JAMES P. THURMON,
LEMUEL THURMON.

Witnesses:
GEORGE F. BOSWELL,
HENRY MIDDLEKAMP.